(12) United States Patent
Yashunin et al.

(10) Patent No.: US 12,196,569 B2
(45) Date of Patent: Jan. 14, 2025

(54) SYSTEM AND METHOD FOR VEHICLE-MOUNTED NAVIGATION KEY POINT LOCALIZATION

(71) Applicant: Harman International Industries, Incorporated, Stamford, CT (US)

(72) Inventors: Dmitry Aleksandrovich Yashunin, Nizhny Novgorod (RU); Roman Dmitrievich Vlasov, Nizhniy Novgorod (RU); Andrey Viktorovich Filimonov, Kamenki (RU)

(73) Assignee: HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 201 days.

(21) Appl. No.: 18/040,138

(22) PCT Filed: Jul. 31, 2020

(86) PCT No.: PCT/RU2020/000401
§ 371 (c)(1),
(2) Date: Jan. 31, 2023

(87) PCT Pub. No.: WO2022/025787
PCT Pub. Date: Feb. 3, 2022

(65) Prior Publication Data
US 2023/0273038 A1 Aug. 31, 2023

(51) Int. Cl.
*G06V 20/58* (2022.01)
*G01C 21/36* (2006.01)
(52) U.S. Cl.
CPC ..... *G01C 21/3647* (2013.01); *G01C 21/3676* (2013.01); *G06V 20/58* (2022.01)
(58) Field of Classification Search
CPC . G01C 21/3647; G01C 21/3676; G06V 20/58
See application file for complete search history.

(56) References Cited

U.S. PATENT DOCUMENTS

2019/0065871 A1 2/2019 Pogorelik
2019/0311298 A1 10/2019 Kopp et al.

FOREIGN PATENT DOCUMENTS

RU 2694154 C2 7/2019
RU 2707153 C1 11/2019

OTHER PUBLICATIONS

Mohammadi, M. et al., "SNN: Stacked Neural Networks," arXiv Cornell University Website, Available Online at https://arxiv.org/abs/1605.08512, Available as Early as May 27, 2016, 8 pages.
(Continued)

*Primary Examiner* — Mathew Franklin Gordon
(74) *Attorney, Agent, or Firm* — McCoy Russell LLP

(57) ABSTRACT

Computer-implemented method for determining coordinates of navigation key points indicative of road sign locations and/or turn points, the method comprising: collecting, as a first training data subset, one or more first images of a first camera comprised in a mobile device; obtaining, as a second training data subset, image-related coordinates of navigation key points related to the images of the first training data subset; supplying the first training data subset and the second training data subset to an artificial neural network as a training dataset; training the artificial neural network on the training dataset to predict image-related coordinates of navigation key points indicative of road sign locations and/or turn points; capturing a second image of a second camera as an input dataset, processing the input dataset by the artificial neural network to predict image-related coordinates of navigation key points indicative of road sign locations and/or turn points.

20 Claims, 12 Drawing Sheets

(56) References Cited

OTHER PUBLICATIONS

Chen, L., "Learning Ensembles of Convolutional Neural Networks," Theory Center University of Chicago Website, Available Online at http://theorycenter.cs.uchicago.edu/REU/2014/final-papers/chen.pdf, Available as Early as Aug. 30, 2017, 9 pages.
ISA European Patent Office, International Search Report and Written Opinion Issued in Application No. PCT/RU2020/000401, Jun. 1, 2021, WIPO, 20 pages.
Federal Service on Intellectual Property, Examination and Search Report Issued in Application No. 2023101394/28 (002922), Dec. 22, 2023, 9 pages.

SYSTEM AND METHOD FOR VEHICLE-MOUNTED NAVIGATION KEY POINT LOCALIZATION

CROSS-REFERENCE TO RELATED APPLICATIONS

The present application is a U.S. National Phase of International Patent Application Serial No. PCT/RU2020/000401 entitled "SYSTEM AND METHOD FOR VEHICLE-MOUNTED NAVIGATION KEY POINT LOCALIZATION," filed on Jul. 31, 2020. The entire contents of the above-referenced application are hereby incorporated by reference for all purposes.

FIELD

The present disclosure relates to systems, methods, and devices for determining geocentric coordinates of navigation key points indicative of road sign locations and/or turn points, and more particularly, to vehicle-mounted navigation key point localization.

BACKGROUND

Vehicle navigation systems are configured to give instructions to a driver of a vehicle, such as to take a turn at the next intersection. Existing systems give instructions by speech synthesis or as pure text on a screen. Thereby, the driver's attention may be driven away from the traffic. This also limits the driver's ability to have a conversation while driving, e. g., by telephone. Other existing systems give instructions using an augmented reality approach, displaying instructions on a screen, embedded into an image created by a vehicle-mounted camera. However, it is desirable to display the instructions in proximity to the position where an action, such as a turn or the change of a lane, may be taken. To do that, it is advantageous to precisely determine such a position, referred to as a navigation key point.

SUMMARY

Disclosed and claimed herein are methods and systems for Vehicle-Mounted Navigation Key Point Localization.

The present disclosure relates to a computer-implemented method for determining coordinates of navigation key points indicative of road sign locations and/or turn points. The method comprises: collecting, as a first training data subset, one or more first images of a camera comprised in a mobile device; obtaining, as a second training data subset, image-related coordinates of navigation key points related to the images of the first training data subset; supplying the first training data subset and the second training data subset to an artificial neural network as a training dataset; training the artificial neural network on the training dataset to predict image-related coordinates of navigation key points indicative of road sign locations and/or turn points; capturing a second image of a camera as an input dataset; and processing the input dataset by the artificial neural network to predict image-related coordinates of navigation key points indicative of road sign locations and/or turn points.

The method may include a training phase and an inference phase. The training phase comprises the steps of collecting, obtaining, and supplying the training data subsets, as well as training the artificial neural network. These steps may be executed on a compute server, which allows benefiting from the high computing power available on a compute server, e. g. in a datacenter. The inference phase comprises the steps of capturing a second image as an input dataset and processing the image. These steps may be executed on a mobile device that executes the trained artificial neural network. The mobile device may be comprised in a navigation system. In an embodiment, the mobile computer may be comprised in a vehicle, and the camera may be a forward facing vehicle-mounted camera. Alternatively, the mobile computer may be a handheld mobile device, e. g. a smartphone. The mobile computer may process the input dataset to determine the navigation key points.

The image-related coordinates indicate the position of navigation key points on an image. They may be expressed as pixel row and column numbers. Processing may comprise the generation of a heat map depicting values of the probability that a point on the image is the navigation key point. Processing may further comprise additional image processing steps known in the art. The navigation key points may be used to correctly display instructions to a driver. This may be achieved by superimposing instructions, street names, and other output over a camera image or a similar depiction of the surroundings of the mobile device.

In an embodiment, the method further comprises translating the image-related coordinates into geocentric coordinates. This is possible since the navigation key points relate to stationary objects, such as road signs, intersection corners, and lanes. This may be done in a two-step process: First, the image-related coordinates are translated, by a projection, into coordinates relative to the device, expressed, for example, as distance and polar angle with respect to a predefined axis fixed to the device. In a second step, the position of the device is determined and the coordinates are transformed into geocentric coordinates, e. g. as longitude and latitude. The geocentric coordinates may then be used by the same mobile device or by other devices to identify key point locations. Thereby, other mobile devices that are not configured to execute the method of the present disclosure may use the data. Furthermore, the data are usable in case camera data are unavailable due to bad weather, a camera malfunction, or other conditions.

In an embodiment, the method further comprises storing the geocentric coordinates in a memory device comprised in a mobile device and/or in a network-accessible server. Thereby, the geocentric coordinates may be shared with other devices, and/or reused if a determination of the navigation key points according to the method of the present disclosure is not possible.

In an embodiment, the method further comprises determining a confidence value for the image-related coordinates. The confidence value indicates a probability that the image-related coordinates are the correct coordinates of the navigation key point. Thereby, they indicate whether the method has determined the coordinates correctly.

In an embodiment, the first training data subset comprises one or more images for which the artificial neural network determines a confidence value below a predefined threshold. Thereby, the training of the neural network is performed more efficiently.

In an embodiment, the artificial neural network is a convolutional neural network. During training, the weights of the convolutional neural network are set such that the convolutional neural network predicts navigation key point marker locations as close as possible to the locations of the navigation key point markers included in the second training data subset. In an embodiment, the coordinates of second training data subset are obtained through at least one of user input, one or more crowdsourcing platforms, and providing established geocentric positions of the key points in the pre-determined region.

In an embodiment, the method further comprises: supplying the first training data subset to a second artificial neural network as input data; predicting, by the second neural network, image-related coordinates of navigation key points based on the first training data subset; and determining a second confidence value indicative of the distances between the navigation key point locations predicted by the trained artificial neural network and the second artificial neural network. Thereby, the effect of the training can be monitored, and parameters, including the threshold for the confidence value, may be adapted.

In an embodiment, the steps of capturing the second image of a camera as an input dataset, and processing the input dataset are executed by a computer attached to or comprised in a mobile device. The mobile device may be a vehicle-mounted navigation system, a handheld navigation system, or a smartphone executing a navigation application software, configured to execute the method of the present disclosure.

In an embodiment, the method further comprises displaying the second image and/or other environmental data, superimposed with graphical and/or text output based on the image-related coordinates. This approach of displaying data is referred to as augmented reality approach. Prior to displaying on a screen, a camera image can be superimposed with, e. g., a depiction of a street sign, an indication of a place a street leads to, or a direction to take a turn in order to follow a route. Alternatively, the information can be displayed on a head-up display or a similar device and is then superimposed over the user's view of the surroundings.

In an embodiment, the method further comprises using previously determined geocentric coordinates in response to the confidence information being lower than a predefined threshold. Thereby, the system continues operating in case the confidence value is too low.

In an embodiment, the method further comprises determining a position of the mobile device based on the geocentric coordinates and geocentric coordinates of the navigation key points previously stored in the mobile device. The determination of the position comprises three steps: First, coordinates of the navigation key point relative to the mobile device are determined. Second, known geocentric coordinates of the same navigation key point are determined. Third, the position of the mobile device is calculated based on the known geocentric coordinates and the relative position. This allows determining the position of the mobile device even in case of outage of a global navigation system.

In an embodiment, the method further comprises storing the geocentric coordinates in a network-accessible memory. Thereby, positions of navigation key points may be shared between a plurality of devices, so that augmented navigation devices need not execute the steps of the method for all navigation key points. This reduces the number of compute operations on the mobile devices, and thereby reduces the power consumption of the devices. Furthermore, the data can be reused in case the method cannot be executed due to camera failure, bad weather, or because the view on the navigation key point is obstructed by other objects, such as other vehicles.

In an embodiment, a top-view map and a camera image may both be processed by the artificial neural network to determine the positions of the navigation key points. This improves the reliability of the method, in particular if parts of the scene are obstructed by objects, e. g., other vehicles.

BRIEF DESCRIPTION OF THE DRAWINGS

The features, objects, and advantages of the present disclosure will become more apparent from the detailed description set forth below when taken in conjunction with the drawings in which like reference numerals refer to similar elements.

DETAILED DESCRIPTION OF THE PREFERRED EMBODIMENTS

Figure 1:
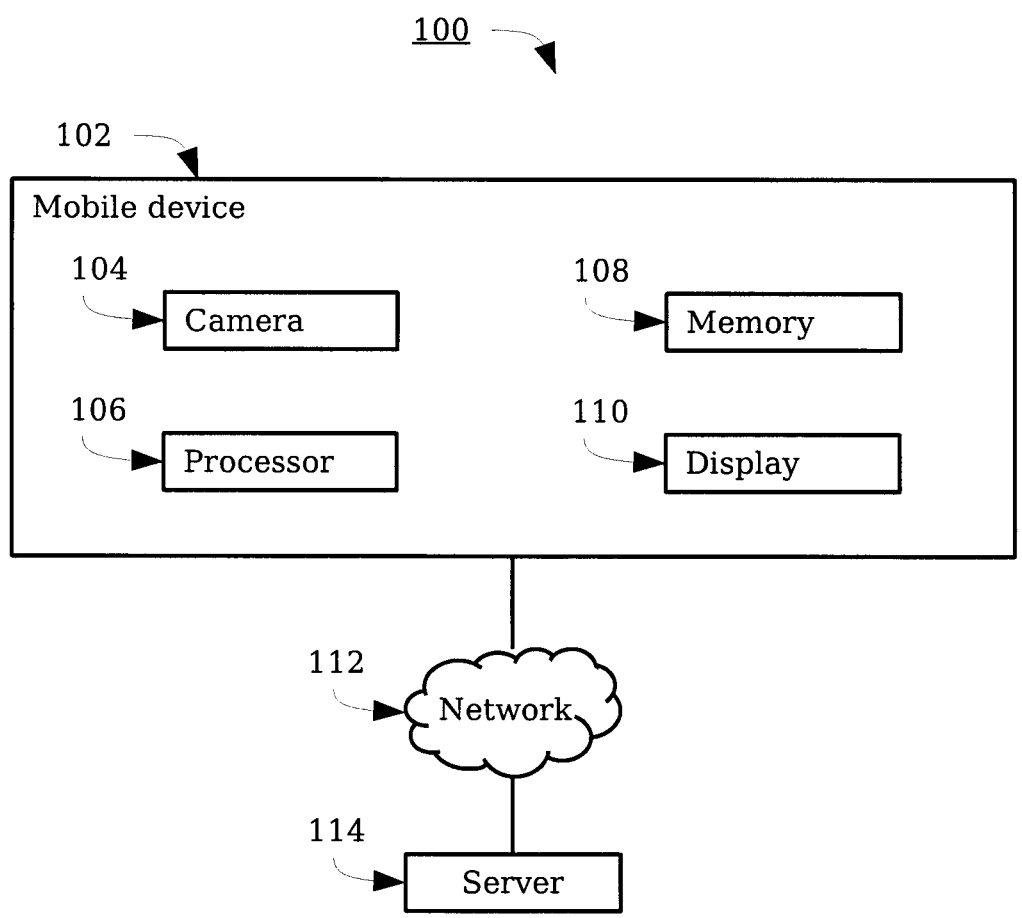
FIG. 1 depicts a block diagram of a system for determining coordinates of navigation key points.

FIG. 1 depicts a block diagram of a system 100 for determining coordinates of navigation key points, according to an exemplary embodiment of the present disclosure. The system 100 comprises a mobile device 102, and a server 114, which are connected via a network 112. The network 112 may be a cellular mobile network, a satellite connection, a wireless local area network, or any other computer network known in the art. The mobile device 102 may be a navigation system comprised in a vehicle and comprises a camera 104, which may be a forward facing camera of a vehicle. The mobile device 102 further comprises a processor 106 and a memory 108. The camera 104 captures an image that is to be processed by the processor 106 using an artificial neural network. The memory 108 stores the software, in particular the artificial neural network, and data, including camera images and navigation key point coordinates. The mobile device 102 further comprises a display 110 to show the output of the processing step. The display 110 may be a screen that shows an image, with additional information overlaid. Alternatively, the display 110 may be, for example, a head-up display of a vehicle, or head-mounted display. The server 114 is configured to train the artificial neural network. It should be noted that FIG. 1 merely depicts an exemplary embodiment. Steps of the method may also be executed on other devices. For example, the artificial neural network may be trained on the mobile device.

Figure 2:
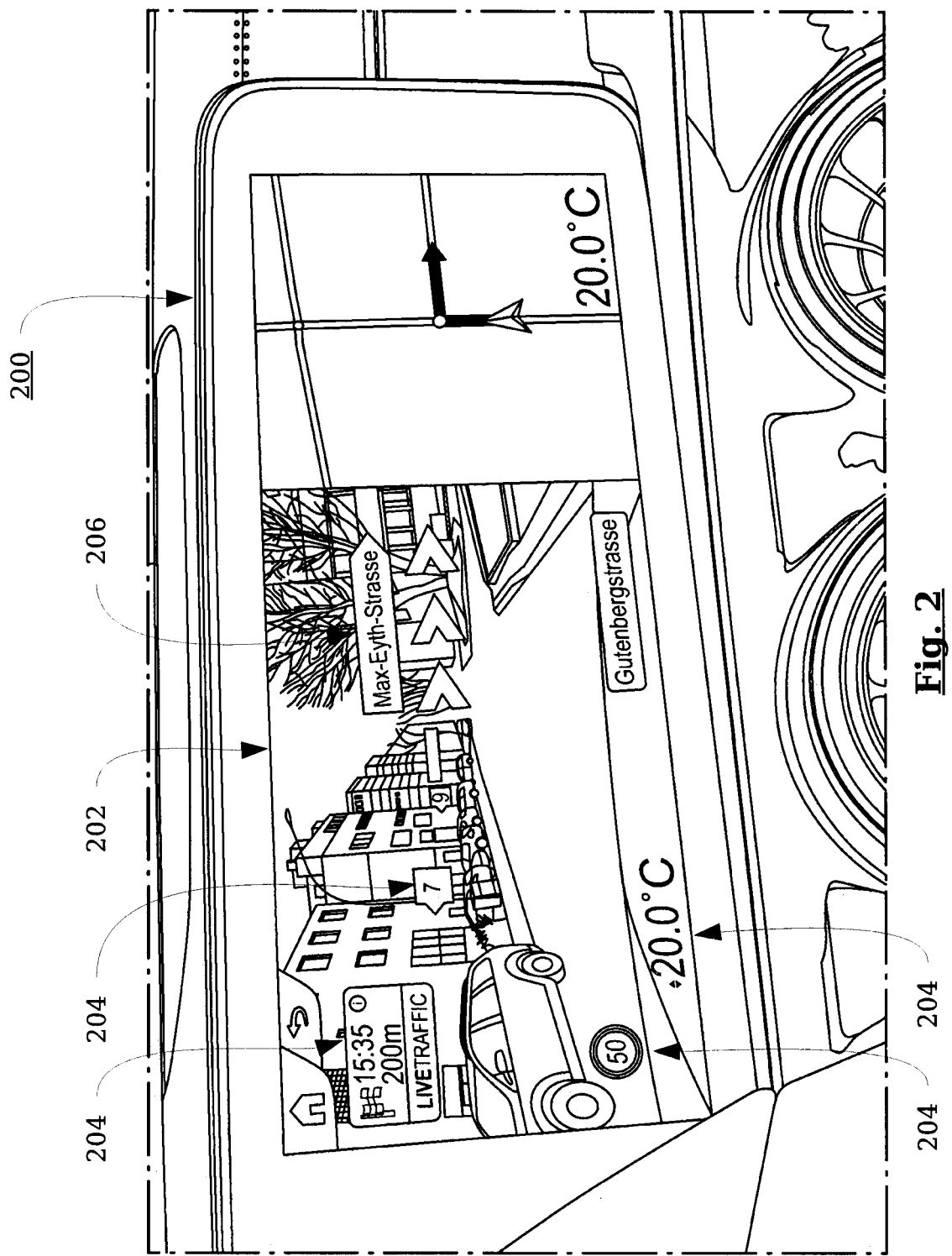
FIG. 2 illustrates an example augmented navigation system.

FIG. 2 shows an example of an augmented navigation system 200. On the display of the augmented navigation system 200, a scene image 202 is shown that has been captured, for example, by a forward-facing camera of the vehicle. The scene image 202 is overlaid with additional information/content 204, 206 such as maximum velocity, current temperature, current time and distance to destination, location of the destination (street number "7"), name of the street currently travelled on, and the next diverting street combined with a turn point marker 302. The turn point marker 206 represents a virtual road sign.

Figure 3:
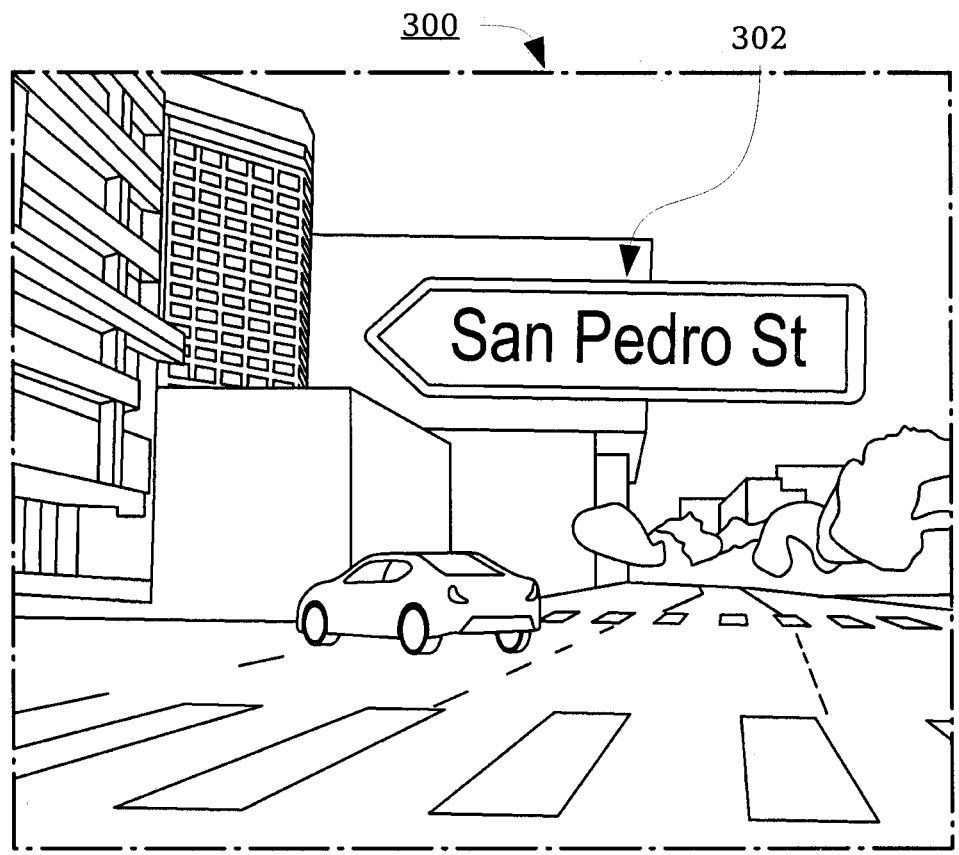
FIG. 3 illustrates an example image with overlaid indications generated by an augmented navigation system.
Figure 4:
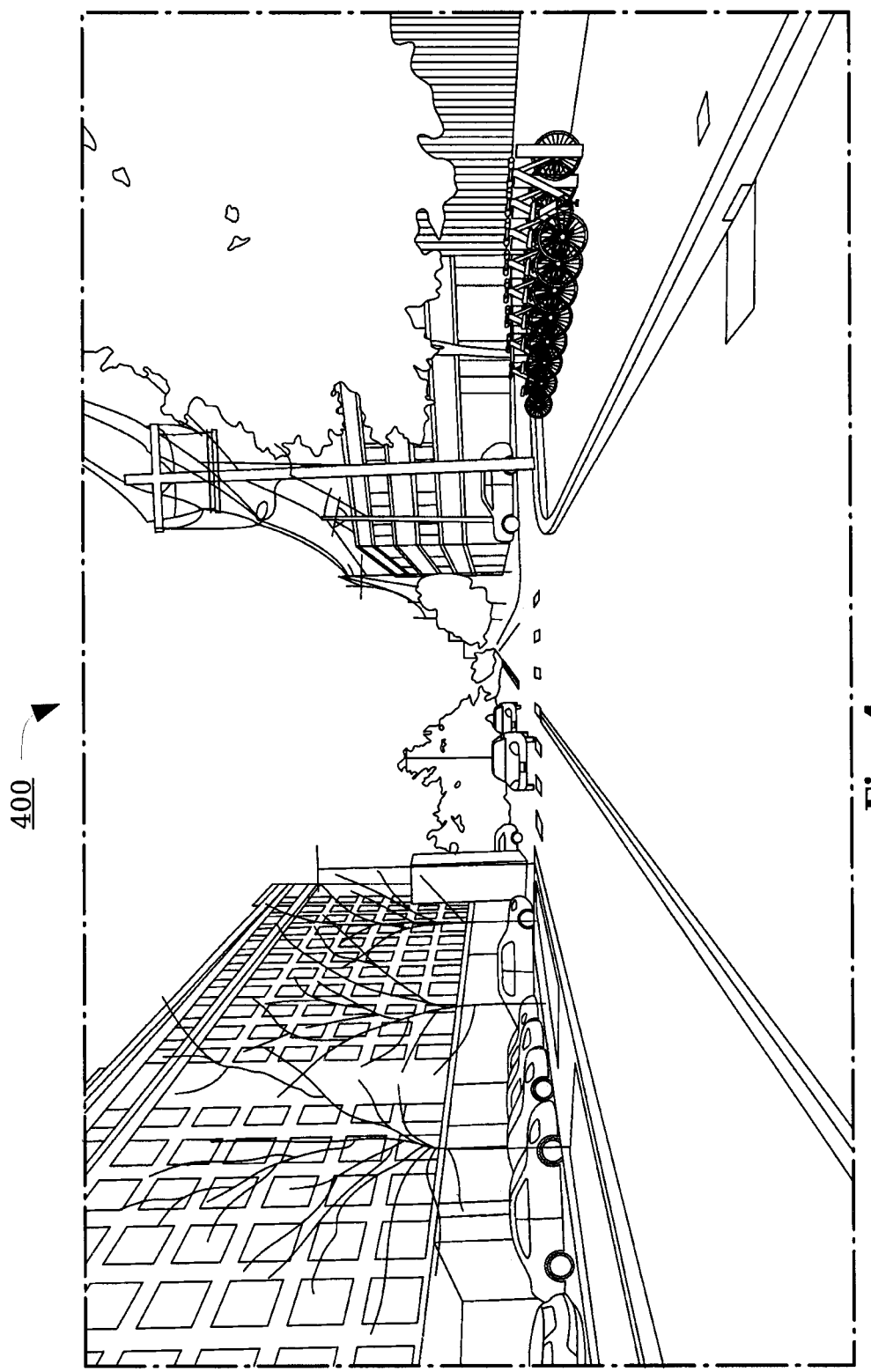
FIG. 4 illustrates an example camera image.
Figure 5:
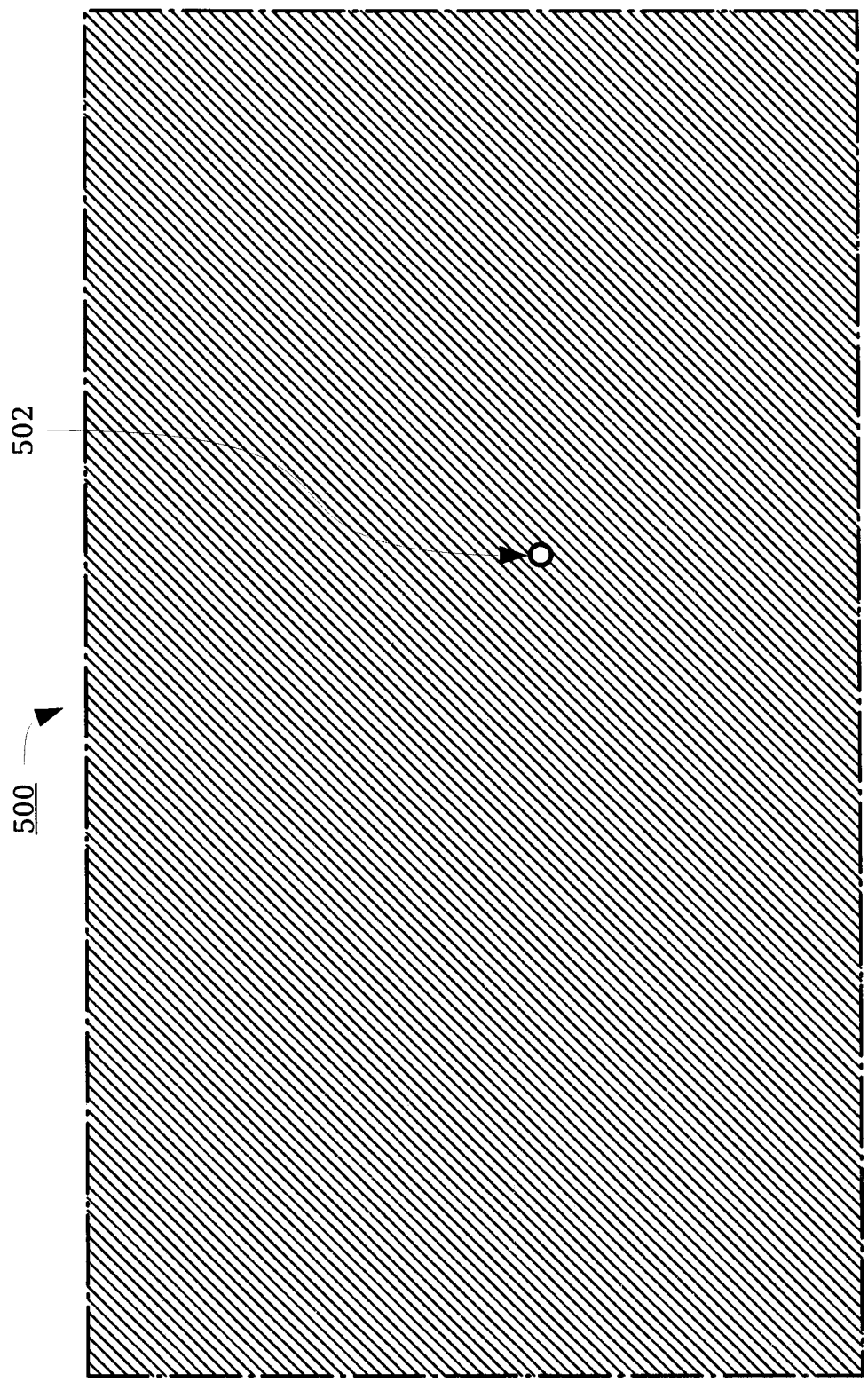
FIG. 5 illustrates an example output mask generated by the artificial neural network using the camera image of FIG. 4.
Figure 6:
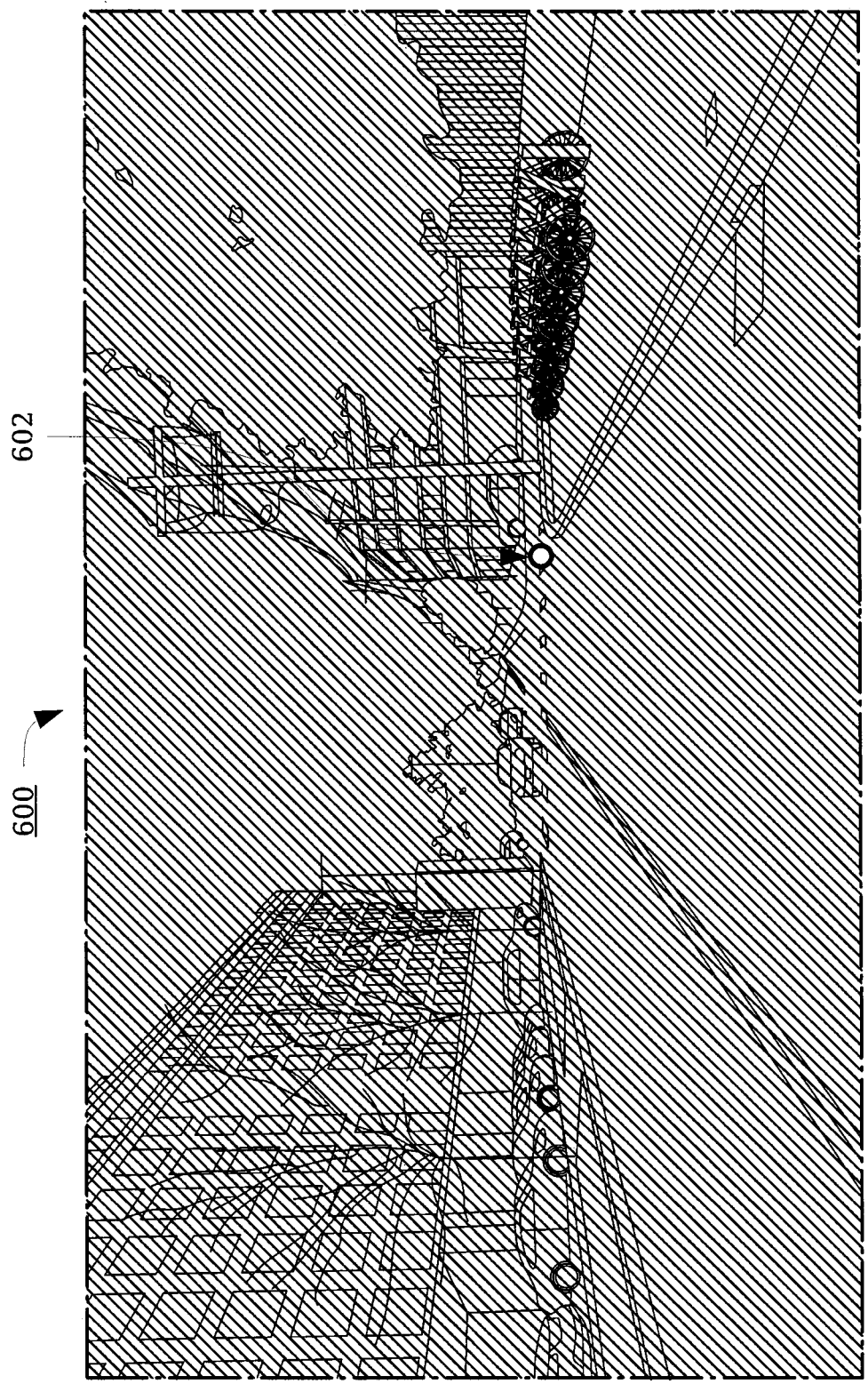
FIG. 6 depicts an overlay of FIGS. 4 and 5.
Figure 7:
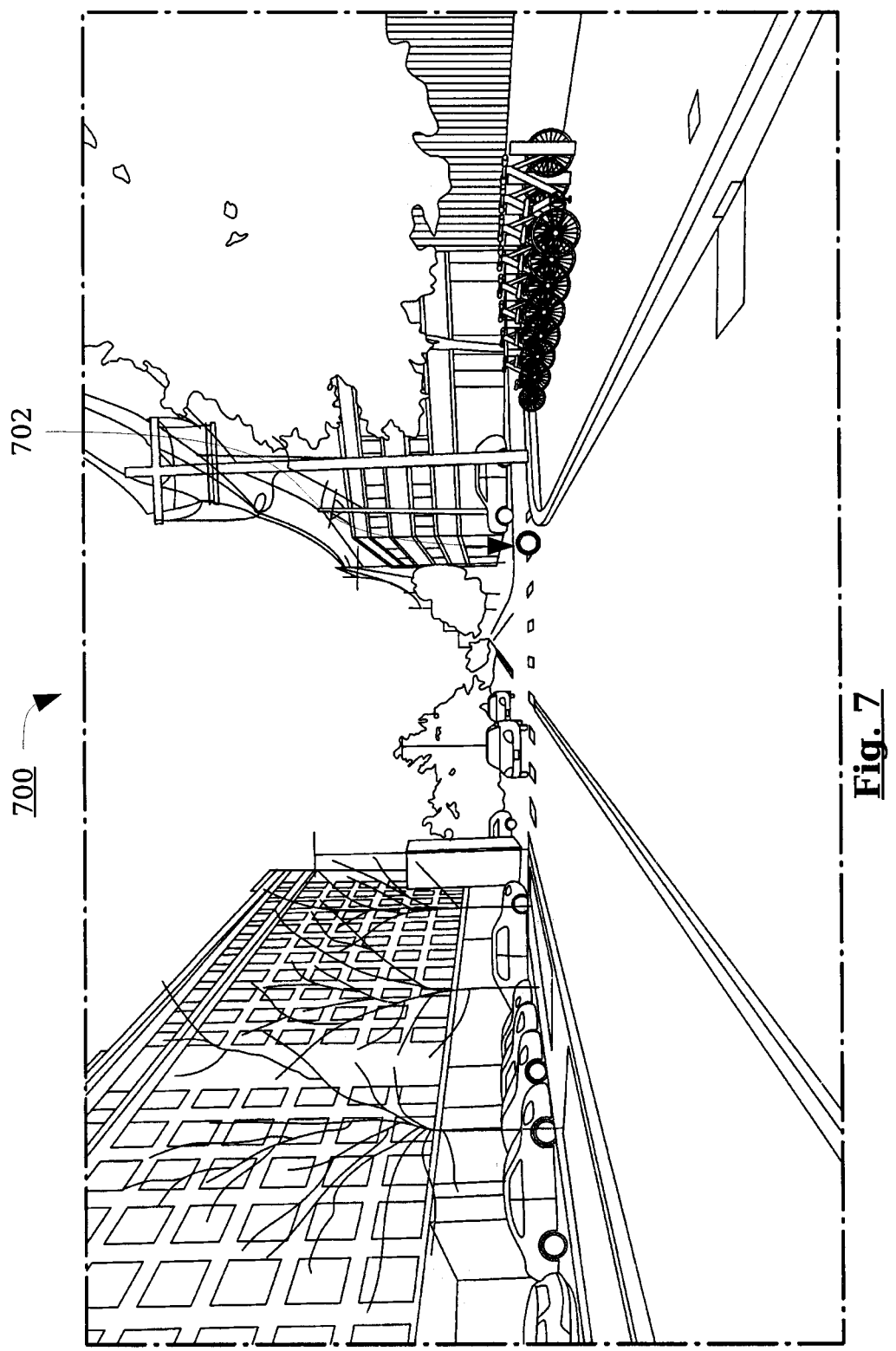
FIG. 7 depicts FIG. 4 with a marker indicating a navigation key point.

FIG. 3 shows a further example of a (portion of a) display of an augmented navigation system wherein the shown scene image 300 is augmented with a turn point marker 302 in form of a virtual road sign indicating a left turn. The turn point markers 206, 302 shown in FIGS. 2 and 3 represent key point markers marking navigation key points on a travel route of a vehicle. On the navigation key points the driver may wish to perform a driving maneuver such as taking a right or left turn, or changing lanes. A key point marker, i. e., a virtual road sign or a virtual line change sign, superimposed onto the scene image, helps the driver in making maneuvering decisions. The key point markers are bound to specific locations, i. e., the navigation key points, within the physical environment of the vehicle, and have therefore fixed determined geocentric coordinates. The augmented navigation system is configured to determine the coordinates and to display the environment of the vehicle with the overlaid key point markers. In order to reach that goal, their coordinates are determined. They may have the form of coordinates on the camera image, i. e. pixel row and column. Alternatively and equivalently, they may have the form of coordinates in proximity to the vehicle, i. e. a distance and a polar angle, or Cartesian coordinates of the type, e. g., "x meters ahead, y meters to the left". Alternatively and equivalently, the coordinates may have the form of geocentric coordinates, i. e. degrees of latitude and longitude.

FIGS. 4-7 illustrate the analysis with an exemplary input image 400. A camera 104 captures an image 400, when the vehicle is approaching an intersection. Upon inference, the image is processed using the artificial neural network. The output of processing is a map 500 indicating for each pixel the probability that the pixel is the navigation key point. For simplicity, the image shows a region 502, 602 in the image where the probability that the navigation key point is situated therein exceeds a threshold value. As can be seen in the overlay image 600 of images 400 and 500, the region is situated at the corner of the intersection. According to an embodiment, an image 700 composed of the input image 400 and a marker 702 for the navigation key point may be presented. Alternatively, a direction to the street may be placed at a position based on the navigation key point, e. g. an arrow or a text output indicating a street name.

Figure 8:
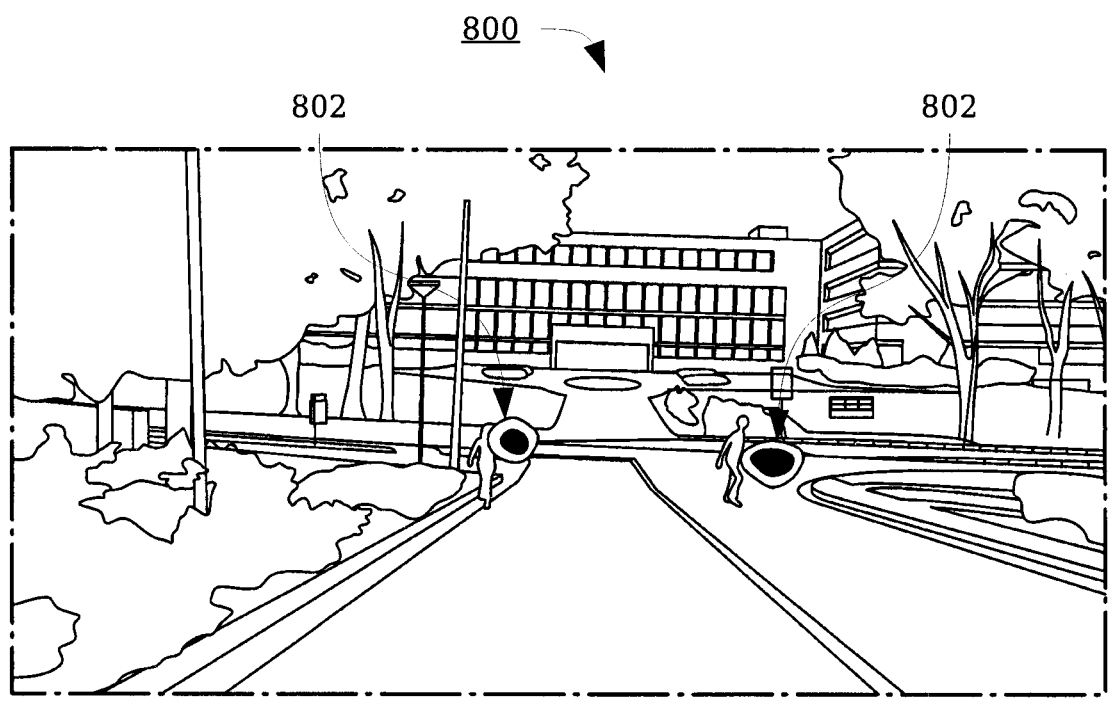
FIG. 8 illustrates an overlay of an example image with an example output mask generated by the artificial neural network.

FIG. 8 shows another example overlay image 800. It comprises an image captured by a forward facing camera 104, when the vehicle is approaching an intersection. Overlaid over the image are, at two positions 802, 804, contour plots indicative of regions of high (white with black line around) and very high (filled black) probability that the navigation key point is comprised therein. These contours are determined by a neural network and post-processed so that, e. g., a maximum value, or individual center of mass positions are determined.

Figure 9:
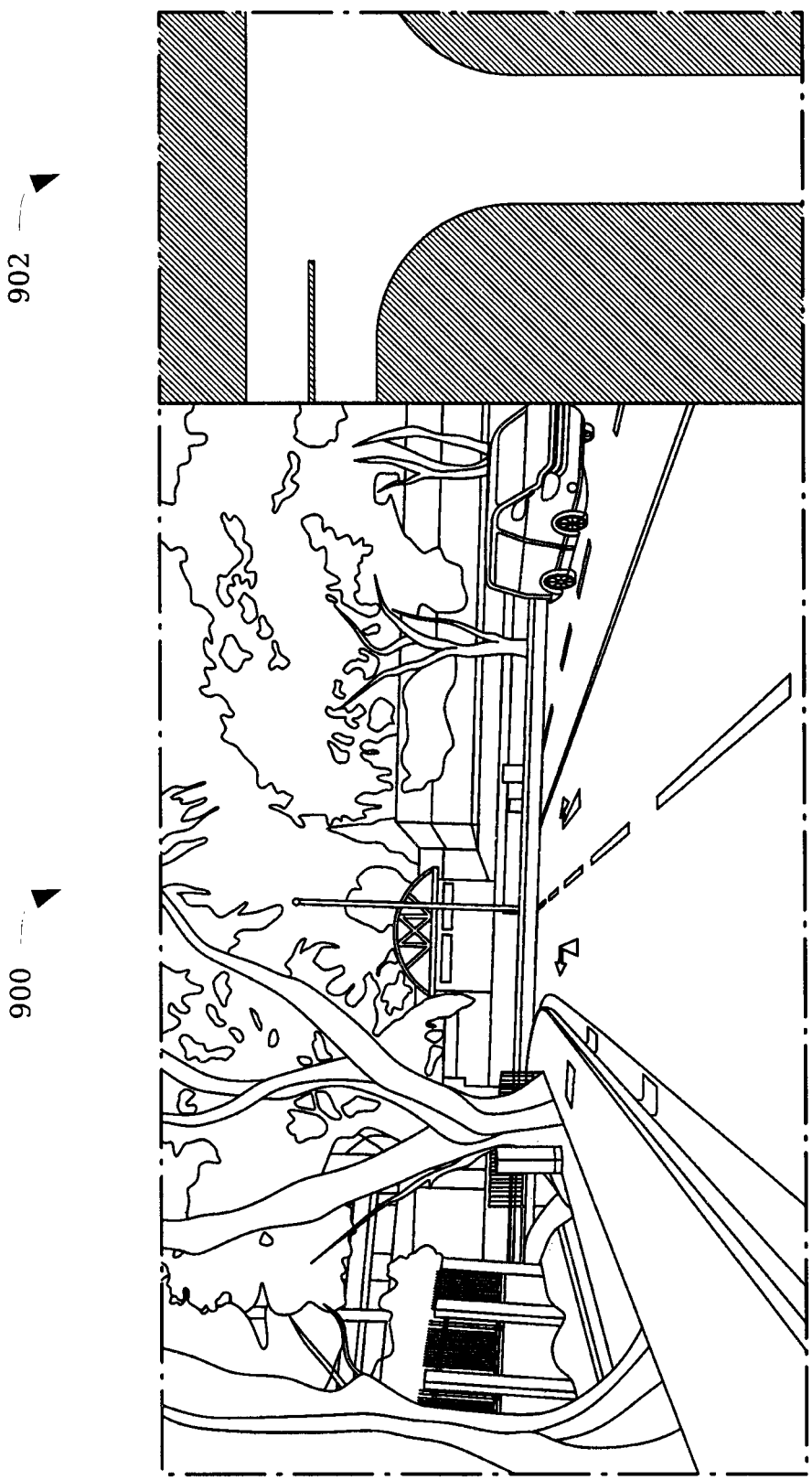
FIG. 9 illustrates an example image of a camera and a corresponding top-view map.

FIG. 9 shows another example camera image, and a schematic top-view map generated from a standard definition road map. A schematic top-view map may alternatively be generated from an aerial or satellite image, and may be stored in a memory in the vehicle. The top-view map may also be a purely topological map, wherein roads and their connections are presented as edges and vertices of a graph with known coordinates. Alternatively, satellite, aerial, or map images may be used directly. An exemplary embodiment, both images may be used as an input for processing, thereby increasing the reliability and accuracy of the determination of a navigation key point. As an optional preprocessing step, either the camera image or the schematic top-view image may be perspectively transformed so that image coordinates (pixel row and column) of both input images relate to the same geocentric coordinates. This is particularly helpful when the quality of the camera image is low due to bad weather (e. g. fog) or other circumstances (e. g. impurities on the camera). In an embodiment, the top-view map and the camera image may both be processed by the artificial neural network to determine the positions of the navigation key points. This improves the reliability of the method, in particular if parts of the scene are occluded by objects, e. g., other vehicles.

Figure 10:
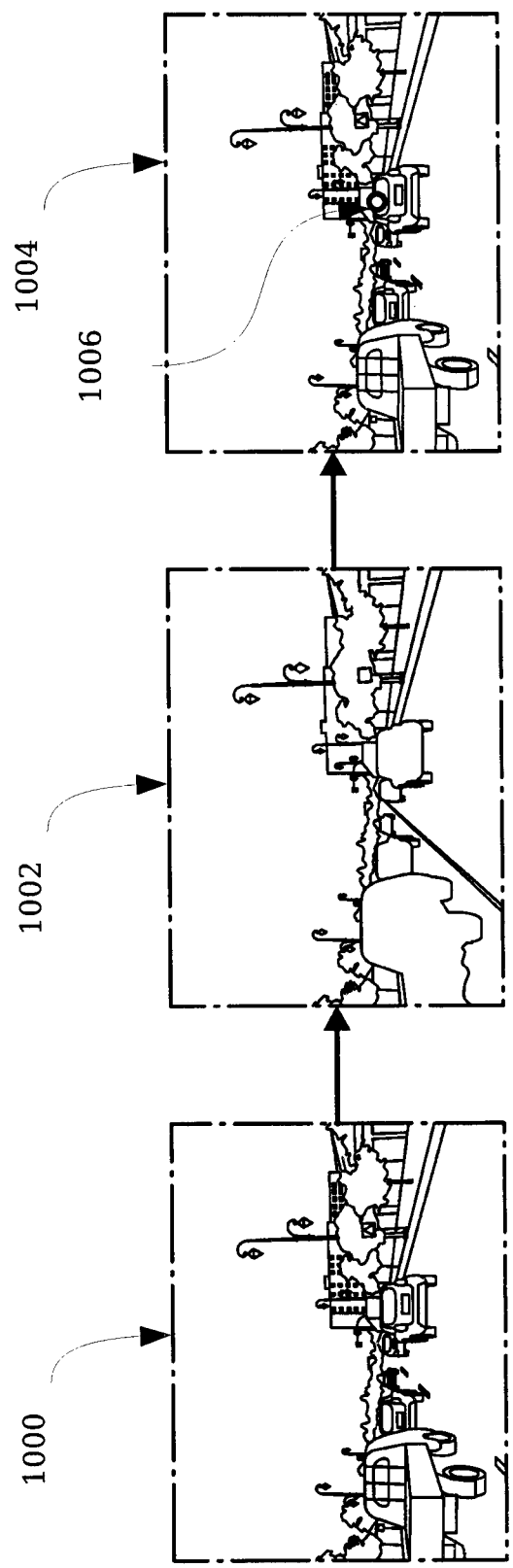
FIG. 10 illustrates a series of images during processing by a convolutional neural network.

FIG. 10 illustrates an example three-step process of processing of the forward facing camera image according to an embodiment of the present disclosure. The image 1000 from a forward facing camera serves as an input. The artificial neural network then processes the image using a semantic approach. Different areas of the image, covered by different types of objects, are identified: The street, other vehicles, stationary objects, the sky, and lane/street delimitations. Image 1002 illustrates the intermediate (processed) image. Lines correspond to borders between areas related to different types of objects. In the next step, the navigation key point is determined based on this semantic understanding of the image. This approach allows determining the navigation key point even if its location is occluded by other objects. The result is shown in image 1004, where the marker 1006 indicates the location of the navigation key point.

Figure 11:
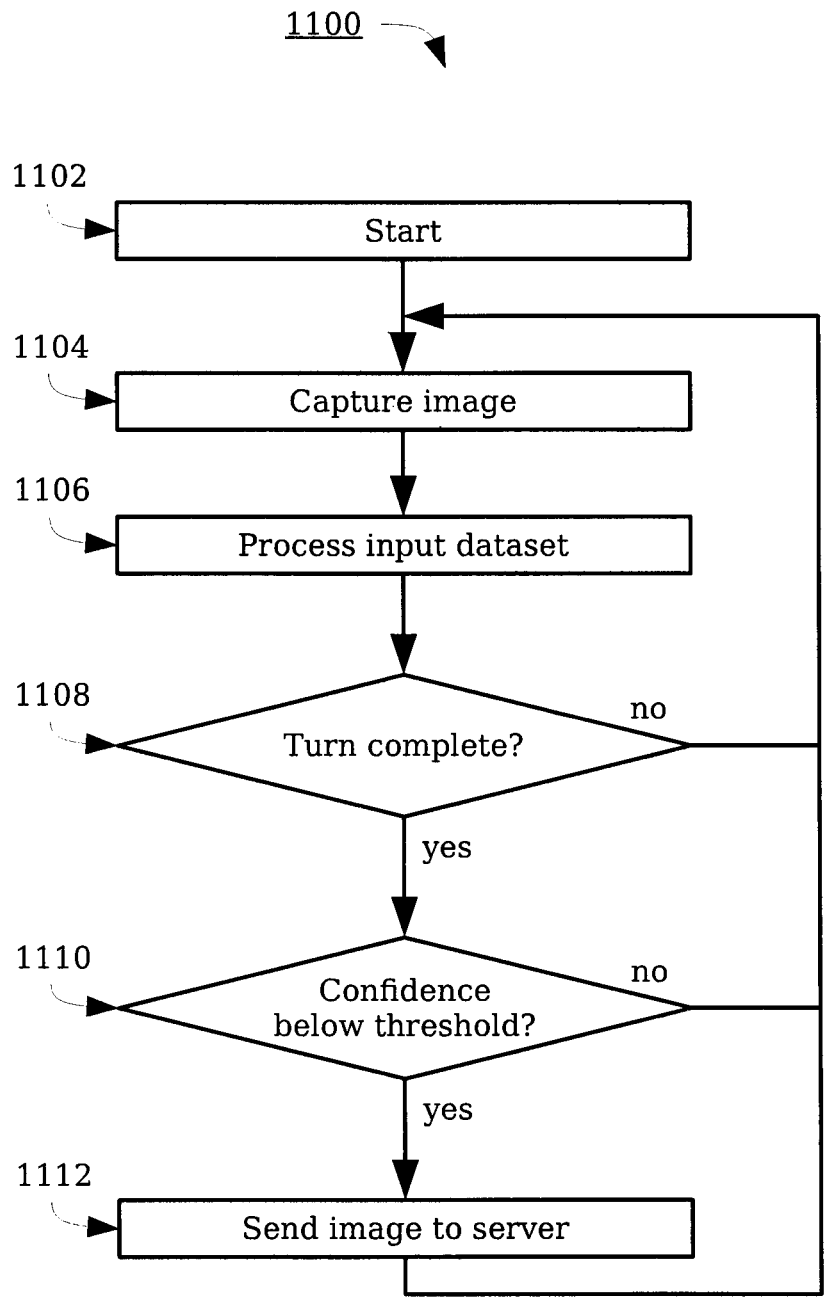
FIG. 11 depicts a flow chart of a method of inference of an artificial neural network to determine navigation key points.

FIG. 11 depicts a flow chart of an exemplary method 1100 of inference of an artificial neural network to determine navigation key points, according to an embodiment of the present disclosure. The process is executed by a mobile device 102, e. g. a navigation computer in a vehicle. It starts, 1102, when operation of the mobile device is initiated or the feature is activated. From this moment, it is executed as a loop, processing a continuous video feed by either processing all captured images or a periodic subset (e. g. every other or every third image). An image is captured 1104 by a camera and serves as an input to the artificial neural network. The processor 106 then processes 1106 the image to predict the image-related coordinates of one or more navigation key points. Together with the coordinates of the navigation key points, a confidence measure is determined. Subsequently, it is determined 1108 whether the vehicle has completed a turn into another street. If this is the case, and 1110 the confidence value is below a threshold, the input image is sent to a server 1112. In any case, the process is started anew as the loop is closed.

Figure 12:
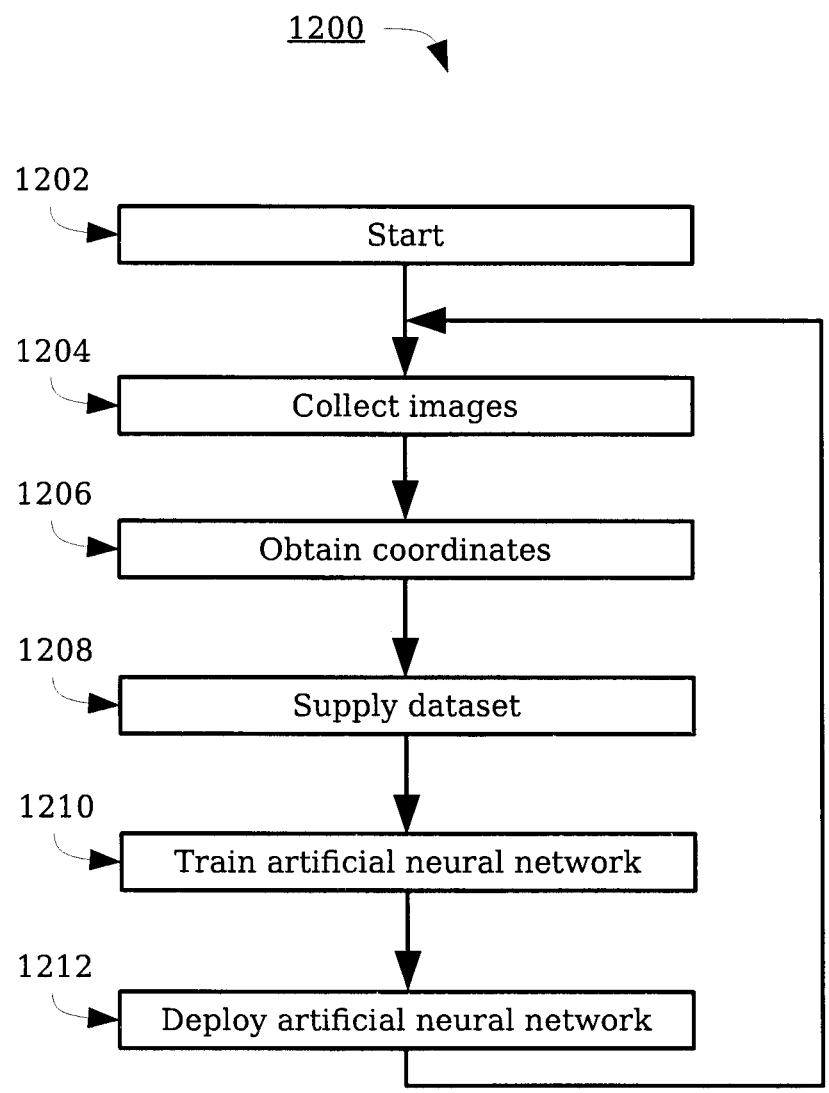
FIG. 12 depicts a flow chart of a method for training an artificial neural network to determine navigation key points.

FIG. 12 depicts a flow chart of a method 1200 for training an artificial neural network to determine navigation key points, according to an embodiment of the present disclosure. The process is executed by a server 114. It is performed as a loop. At block 1204, images are collected that have been processed on a mobile device and in which the confidence value was below the threshold (as described referring to FIG. 11). The images form a first training data subset. Furthermore, correct coordinates of the navigation key point are obtained 1206 as a second training data subset. The two training data subsets are supplied 1208 to the artificial neural network as a training dataset. Subsequently, the artificial neural network is trained 1210 on the training dataset to predict image-related coordinates of navigation key points indicative of road sign locations and/or turn points. Once the quality of the artificial neural network has been improved, the model is deployed 1212 onto the mobile devices.

REFERENCE SIGNS

100 System
102 Mobile device
104 Camera
106 Processor
108 Memory
110 Display
112 Network
114 Server
200 Augmented navigation system
202 Scene image
204, 206 Additional information/content
300 Image
302 Turn point marker
400 Image
500 Map
502 Region of high probability of a navigation key point
600 Overlay image
602 Region of high probability of a navigation key point
700 Output image
702 Marker
800 Overlay image
802, 804 Contour plots
900 Camera image
902 Schematic top-view map
1000 Camera image as input
1002 Intermediate image
1004 Camera image, marked
1006 Marker indicating navigation key point
1100 Method for processing images
1102-1112 Steps of a method for processing images
1100 Method for training an artificial neural network
1102-1112 Steps of a method for training an artificial neural network

The invention claimed is:

1. A computer implemented method for determining coordinates of navigation key points indicative of road sign locations, turn points, or both, comprising:
collecting, as a first training data subset, one or more first images of a first camera comprised in a mobile device;
obtaining, as a second training data subset, image-related coordinates of navigation key points related to the one or more first images of the first training data subset;
supplying the first training data subset and the second training data subset to an artificial neural network as a training dataset;
training the artificial neural network on the training dataset to predict image-related coordinates of navigation key points indicative of road sign locations, turn points, or both;
capturing a second image of a second camera as an input dataset; and
processing the input dataset by the artificial neural network to predict image-related coordinates of navigation key points indicative of road sign locations, turn points, or both.

2. The computer-implemented method of claim 1, further comprising:
translating the image-related coordinates into geocentric coordinates.

3. The computer-implemented method of claim 2, further comprising:
storing the geocentric coordinates in a memory device comprised in the mobile device, a network-accessible server, or both.

4. The computer-implemented method of claim 1, further comprising:
determining a confidence value for the image-related coordinates.

5. The computer-implemented method of claim 1, wherein the first training data subset comprises one or more images for which the artificial neural network determines a confidence value to be below a threshold value.

6. The computer-implemented method of claim 1, wherein the artificial neural network is a convolutional neural network.

7. The computer-implemented method of claim 1, wherein the coordinates of second training data subset are obtained through at least one of user input, one or more crowdsourcing platforms, and provided coordinates of navigation key points.

8. The computer-implemented method of claim 1, further comprising:
supplying the first training data subset to a second artificial neural network as input data;
predicting, by the second artificial neural network, image-related coordinates of navigation key points based on the first training data subset; and
determining a second confidence value indicative of distances between the image-related coordinates of navigation key points predicted by the trained artificial neural network and image-related coordinates of navigation key points predicted by the second artificial neural network.

9. The computer-implemented method of claim 1, wherein the capturing of the second image of the second camera as the input dataset, and the processing the input dataset, are executed by the mobile device.

10. The computer-implemented method of claim 1, further comprising:
displaying the second image, other environmental data, or both, superimposed with graphical output, text output, or both, based on the image-related coordinates.

11. The computer-implemented method of claim 1, further comprising:
using previously determined geocentric coordinates in response to confidence information being lower than a threshold value.

12. The computer-implemented method of claim 2, further comprising:
determining a position of the mobile device based on the geocentric coordinates and geocentric coordinates of the navigation key points previously stored in the mobile device.

13. The computer-implemented method of claim 2, further comprising:
storing the geocentric coordinates in a network-accessible memory.

14. The computer-implemented method of claim 1, wherein the input dataset further comprises a top-view map representative of objects recorded by the second image.

15. A system for determining coordinates of navigation key points indicative of road sign locations, turn points, or both comprising:
a first computing device being remotely accessible;
a first camera;

a second computing device comprised in a mobile device; and a second camera comprised in the mobile device;

wherein:

the second computing device is configured to:
- collect, as a first training data subset, one or more first images of the first camera;
- obtain, as a second training data subset, image-related coordinates of navigation key points related to the one or more first images of the first training data subset;
- supply the first training data subset and the second training data subset to an artificial neural network as a training dataset; and
- train the artificial neural network on the training dataset to predict image-related coordinates of navigation key points indicative of road sign locations, turn points, or both;

the second camera is configured to capture a second image; and the second computing device is configured to process the second image as an input dataset by the artificial neural network to predict image-related coordinates of navigation key points indicative of road sign locations, turn points, or both.

16. The system of claim 15,
wherein the first computing device or the second computing device is further configured to translate the image-related coordinates into geocentric coordinates.

17. The system of claim 15,
wherein the first training data subset comprises one or more images for which the artificial neural network determines a confidence value to be below a threshold value.

18. The system of claim 15,
wherein the second computing device is further configured to:

supply the first training data subset to a second artificial neural network as input data;

predict, by the second artificial neural network, image-related coordinates of navigation key points based on the first training data subset; and determine a second confidence value indicative of distances between the image-related coordinates of navigation key points predicted by the trained artificial neural network and image-related coordinates of navigation key points predicted by the second artificial neural network.

19. The system of claim 15,
wherein the first computing device is further configured to display the second image, other environmental data, or both, superimposed with graphical output, text output, or both based on the image-related coordinates.

20. The system of claim 15,
wherein the input dataset further comprises a top-view map representative of objects recorded by the second image.

* * * * *